United States Patent [19]
Sasaki et al.

[11] Patent Number: 6,100,215
[45] Date of Patent: Aug. 8, 2000

[54] PROCESS FOR PRODUCING PARTICULATE IRON-ANTIMONY CONTAINING OXIDE COMPOSITION HAVING HIGH COMPRESSIVE STRENGTH

[75] Inventors: Yutaka Sasaki; Kunio Mori; Yoshimi Nakamura; Koichi Mizutani, all of Yokohama, Japan

[73] Assignee: Mitsubishi Rayon Co., Ltd., Tokyo, Japan

[21] Appl. No.: 08/993,577

[22] Filed: Dec. 18, 1997

[30] Foreign Application Priority Data

Dec. 18, 1996 [JP] Japan ..................................... 8-353705

[51] Int. Cl.$^7$ ...................... H01L 21/8238; H01L 21/331
[52] U.S. Cl. ........................... 502/201; 502/338; 502/353; 502/503
[58] Field of Search ..................................... 502/201, 338, 502/353, 503

[56] References Cited

U.S. PATENT DOCUMENTS

| | | | |
|---|---|---|---|
| 3,341,471 | 9/1967 | Callahan et al. | 252/451 |
| 3,657,155 | 4/1972 | Yoshino et al. | 252/456 |

*Primary Examiner*—John F. Niebling
*Assistant Examiner*—Alexander G. Ghyka
*Attorney, Agent, or Firm*—Wenderoth, Lind & Ponack, L.L.P.

[57] ABSTRACT

There is provided a process for producing a particulate iron-antimony containing oxide composition having high compressive strength, comprising the steps of: providing an aqueous slurry containing iron ions, nitrate ions and antimony trioxide; adjusting the slurry to a pH value in the range of 0.5 to 3 as measured at 40° C.; heating the slurry; spray-drying the heated slurry; and calcining the resultant particles.

4 Claims, No Drawings

PROCESS FOR PRODUCING PARTICULATE IRON-ANTIMONY CONTAINING OXIDE COMPOSITION HAVING HIGH COMPRESSIVE STRENGTH

BACKGROUND OF THE INVENTION

1. Field of the Invention

The present invention relates to a process for producing a particulate iron-antimony containing oxide composition having high compressive strength.

2. Background Art

Iron-antimony containing oxide compositions can be used as useful materials, such as inorganic ion-exchangers (see, for example, J. Inorg. Nucl. Chem. 4, 2121 (1981)), ceramics for sensors (see, for example, Proceedings of the 78th Annual Meeting of Catalyst Society of Japan (A), p. 141, (1996)) and, in addition, as precursors of catalysts and catalysts for fluidized beds.

Conventional methods for producing an iron-antimony containing oxide composition for use as a catalyst include, for example, one wherein a precipitate is obtained by coprecipitation from a solution of iron nitrate and antimony chloride in hydrochloric acid and then washed and calcined [see G. K. Boreskov et al.; Kinet. i Katal. 10 (6) 1350–1359 (1969), V. F. Anufrienko et al.; ibid. 14 (3) 716–721 (1973) and the like] and one which comprises oxidizing antimony trioxide with hydrogen peroxide to give antimony pentoxide, adding iron nitrate to a suspension of the resultant antimony pentoxide, heat-treating the mixture, drying the resultant material, and calcining the dried material (see U.S. Pat. No. 3,984,353). When use of an iron-antimony containing oxide composition as a catalyst for a fluidized bed reaction is contemplated, conventional production methods of such a catalyst include one which comprises: oxidizing metallic antimony with nitric acid; mixing the resultant antimony oxide with iron nitrate; neutralizing the mixture by addition of aqueous ammonia; washing the neutralized material with water; drying and calcining the washed material; pulverizing the calcined material; adding silica sol to the powder; and spray-drying and calcining the mixture (see U.S. Pat. No. 3,341,471) and one which comprises the steps of: adjusting an aqueous slurry containing a trivalent antimony compound, a ferric compound, nitrate ions, a polyvalent metal compound, and a silica sol as indispensable ingredients to a pH value of not more than 7; heat-treating the slurry at 40 to 150° C. for at least 20 min while maintaining the slurried state; spray-drying the heat-treated slurry; and calcining the resultant particles (see U.S. Pat. No. 3,657,155).

When an iron-antimony containing oxide composition is to be used as a catalyst for a gaseous phase fluidized bed reaction, the catalyst should be excellent in catalytic activity, as well as in mechanical strength. For measuring the mechanical strength of the catalyst for fluidized bed operation, an attrition test by the ACC method has been generally performed in the art. In order to satisfy the above requirements for the catalyst, U.S. Pat. Nos. 3,341,471 and 3,657,155 noted above propose a process for producing an attrition-resistant catalyst for use in a fluidized bed wherein a silica component is used as one indispensable requirement. The catalyst, however, does not always have mechanical strength high enough to be applied to a fluidized bed reactor on a commercial scale, and particles of the catalyst are often crumbled and powdered in a cyclone section for collecting the catalyst generally provided in a fluidized bed reactor, resulting in large catalyst loss, which is a problem remaining unsolved in the art. Further, the strength of the materials produced by the process proposed by the above U.S. patents is unsatisfactory and frequently raises problems also for use of the material as a precursor of a catalyst and in other applications. It is known that compressive strength, defined as the minimum force necessary for crumbling a particle when a load is applied to the particle, is a preferred measure of the resistance to crumbling by mechanical shock. Thus, the development of an improved process for producing a particulate iron-antimony containing oxide composition having high compressive strength has been desired in the art and is an object of the present invention.

SUMMARY OF THE INVENTION

It has been found by the present inventors that a particulate iron-antimony containing oxide composition possessing high compressive strength as well as excellent attrition resistance can be produced without necessarily using the silica component by preparing a slurry containing ingredients for the iron-antimony containing oxide composition in a specific manner.

Thus, the present invention provides a process for producing a particulate iron-antimony containing oxide composition having high compressive strength, comprising the steps of: providing an aqueous slurry containing iron ions, nitrate ions and antimony trioxide; adjusting the slurry to a pH value in the range of 0.5 to 3 as measured at 40° C.; heating the slurry; spray-drying the heated slurry; and calcining the resultant particles.

The process of the present invention can produce a particulate iron-antimony containing oxide composition possessing excellent attrition resistance and high compressive strength.

DETAILED DESCRIPTION OF THE INVENTION

The process of the present invention will be described in more detail.

What is important in the process of the present invention is to adjust an aqueous slurry containing iron ions, nitrate ions and antimony trioxide to a pH value in the range of 0.5 to 3 as measured at 40° C. This enables the production of a particulate iron-antimony containing oxide composition having improved compressive strength. The atomic ratio of iron to antimony in the composition is generally 5 to 23 atoms of antimony, preferably 8 to 20 atoms of antimony, to 10 atoms of iron.

According to the process of the present invention, an aqueous slurry containing iron ions, nitrate ions, and antimony trioxide is first prepared. Iron ion sources usable herein include ferric nitrate and a solution of an electrolytic iron powder in nitric acid.

Nitrate ion sources usable herein include, for example, ferric nitrate usable as the iron ion source and nitric acid.

Commercially available antimony trioxide may be used as the antimony trioxide. It is also possible to use antimony trioxide prepared by oxidizing metallic antimony with nitric acid and then hydrolyzing the oxidization product or by hydrolyzing antimony chloride and then washing the hydrolyzate with water. Two crystal forms, senarmontite and valentinite, are known for antimony trioxide. Both of these crystal forms may be used in the present invention. A particle diameter of not more than 100 $\mu$m suffices for antimony trioxide, and antimony trioxide having such a particle diameter is easily commercially available.

The amount of the nitrate ion in the slurry may generally be not less than 0.5 gram ion, preferably 1 to 5 gram ion, per gram atom of antimony. The nitrate ion functions as an oxidizing agent in the oxidation of antimony trioxide with nitric acid in the step of heat treatment of the slurry described below.

The amount of the iron ion in the slurry may generally be not less than 0.1 gram ion, preferably 0.15 to 2 gram ion, per gram atom of antimony. When the amount of the iron ion is less than 0.1 gram ion, the reaction rate in the oxidation of antimony trioxide with nitric acid tends to become too low for practical operation. Prior to the adjustment of pH, the presence of the iron ion in an amount of at least 0.1 gram ion per gram atom of antimony suffices for the present invention, and incorporation of the whole quantity of the iron ion before the adjustment of pH is not necessarily required. That is, a part of the iron ion may be added to the slurry during the steps of pH adjustment and heat treatment or to the slurry after the heat treatment to bring the amount of the iron ion to a predetermined value.

The aqueous slurry containing iron ions, nitrate ions, and antimony trioxide is adjusted to a pH value generally in the range of 0.5 to 3, preferably 0.8 to 2.7, as measured at a temperature of 40° C. When the pH value of the slurry is below 0.5, aqueous ammonia may be added to the slurry to bring the pH value to the above range, while when the pH value exceeds 3, nitric acid may be added to bring the pH value to the above range. This results in the formation of ammonium nitrate. The presence of ammonium nitrate offers a favorable effect associated with the retention of the strength of particles formed in the step of spray drying. The content of ammonium nitrate is preferably in the range of 5 to 30% by weight based on the solid content of the slurry.

When the pH value at 40° C. is below 0.5 or above 3, the resultant fine particles have low compressive strength. The pH range which is acceptable from the viewpoint of the compressive strength is narrow and critical. When the pH value is below 0.5, an oxidation reaction of antimony trioxide occurs in the heat treatment of the slurry. In this case, the oxidation product in the slurry forms primary particles having a large diameter which are very likely to settle. Therefore, the binding power among the particles is low during calcination, leading to low compressive strength.

On the other hand, when the pH value is above 3, the iron ion is fully precipitated as a hydroxide and hence cannot function as an oxidation catalyst for antimony trioxide. In this case, the slurry is in the form of a mixture of iron hydroxide with antimony trioxide, and oxidation of antimony trioxide does not proceed upon the heat treatment. Further, both the particles formed by spray drying and the calcined particles have low strength, and the calcination cannot satisfactorily result in the formation of an iron-antimony containing oxide. In general, the pH value varies depending upon the measuring temperature. Therefore, in the present invention, the pH value is specified in terms of a value as measured at 40° C.

According to the present invention, the pH value of the aqueous slurry should be brought to 0.5 to 3 as measured at a temperature of 40° C. When the pH value of the slurry is outside the range of 0.5 to 3 as measured at 40° C., crumbling and powdering are likely to occur during shaping of the particle by spray drying, pneumatic transportation and the like. Even the calcined product has low compressive strength and is likely to be crumbled or powdered. These lead to lowered yield and, in addition, the product is unsatisfactory as the iron-antimony containing oxide composition according to the present invention. Further, even though the product has satisfactory strength as measured by the attrition test using the ACC method, use of the product as a catalyst for a fluidized bed reaction raises such a problem that the catalyst particles are likely to be crumbled at the time of collection by a cyclone in a reactor, resulting in large catalyst loss.

The slurry having a pH value in the range of 0.5 to 3 as measured at 40° C. is then heat treated generally at a temperature of 50 to 120° C., preferably 60 to 110° C. The heat treatment time is generally 0.5 to 10 hr, preferably 1 to 5 hr. Upon the heat treatment, antimony trioxide in the slurry is considered to be oxidized using the iron ion as a catalyst to give fine antimonic acid which is then reacted with the iron ion to give an iron-antimony containing oxide. This enables the particulate iron-antimony containing oxide composition to have satisfactory compressive strength even when a material serving as a binder, for example, silica sol, is absent in the slurry.

In the above heat treatment, phosphoric acid, oxalic acid, urea, or a chelating agent, such as ethylenediamine tetraacetate (EDTA), citric acid, or glycolic acid, may be, if necessary, added because the coexistence thereof permits the rate of the oxidation reaction of antimony trioxide to be controlled as desired. The amount thereof added may be in the range of 0.1 to 10% by weight based on the iron-antimony containing oxide.

The heat-treated slurry is then shaped by spray drying into substantially spherical fine particles. The spray drying may be performed using pressurized nozzle type, rotary disk type, and other various spray driers. The concentration of the slurry to be spray-dried is preferably in the range of about 10 to about 40% by weight in terms of the oxide of elements constituting the iron-antimony containing oxide composition. The spray drying temperature may be in the range of about 100 to about 350° C.

The fine particles formed by the spray drying are precalcined, if necessary, and finally calcined at a temperature of about 400 to about 950° C. The calcination time may be in the range of about 0.5 to about 20 hr. Although the calcination is generally performed in an atmosphere of air, it may be, if necessary, performed in the presence of an inert gas, for example, nitrogen, helium, carbon dioxide gas, or water vapor. Since use of the inert gas, such as nitrogen, accelerates sintering, the calcination temperature may be often lowered. Various calcination devices may be used, and examples thereof include tunnel, rotary, and fluidized calciners.

In the preparation of the iron-antimony containing oxide composition, ingredients other than iron and antimony may coexist in the system, and examples thereof include molybdenum, tungsten, vanadium, tellurium, bismuth, phosphorus, boron, copper, nickel, zinc, and magnesium. These ingredients may be mixed into the slurry in any stage in the course of the preparation of the slurry before the heat treatment to prepare an iron-antimony containing oxide composition. In this connection, it should be noted that some source compounds for these ingredients inhibit the oxidation of antimony trioxide with nitric acid. In such a case, it is possible to use a method wherein, after an iron-antimony containing oxide composition is once prepared, an aqueous slurry containing the iron-antimony containing oxide composition is prepared followed by drying and calcination.

Molybdenum sources usable herein include molybdenum trioxide, molybdic acid, and molybdates, such as ammonium paramolybdate and ammonium metamolybdate.

Tungsten sources usable herein include tungsten trioxide, tungstic acid, and tungstates, such as ammonium paratungstate and ammonium metatungstate.

Vanadium sources usable herein include ammonium metavanadate, vanadyl sulfate, vanadyl oxalate, and vanadium pentoxide.

Tellurium sources usable herein include metallic tellurium, tellurium dioxide, tellurium trioxide, telluric acid, and tellurium nitrate.

Sources for bismuth, phosphorus, boron, copper, nickel, zinc, and magnesium usable herein include oxides, hydroxides, nitrates, carbonates, organic acid salts of these elements.

The iron-antimony containing oxide composition according to the present invention may be used either as such or after it is supported on a suitable carrier, depending upon the application of the composition. Carriers usable herein include silica, alumina, silica alumina, titania, zirconia.

When use of the iron-antimony containing oxide composition as an ion exchanger, a ceramic, a catalyst for a fixed bed and the like is contemplated, the composition may be further ground and shaped depending upon the application. When shaping of the composition is performed, a preferred method is such that, after removal of ammonium nitrate at a temperature of 200 to 400° C., the composition is shaped and, if necessary, dried and precalcined followed by final calcination.

The following examples further illustrate the present invention but are not intended to limit it.

In the following examples, the strength of the particulate iron-antimony containing oxide composition was evaluated by the following methods.

(1) Compressive strength of particle

Apparatus: Shimadzu MCTM-200, manufactured by Shimadzu Seisakusho Ltd.

Measuring conditions

Indenter:
Upper pressing indenter: 500 μm flat indenter made of diamond
Lower pressing plate: SUS plate Loading rate: 0.72 g-weight/sec Particles were sieved by Micromesh High Precision Sieves to collect particles having a size of 45 to 50 μm, and 30 particles among them were measured for the compressive strength [g-weight/particle], and the compressive strength was expressed in terms of the average value of the measurements for the 30 particles.

(2) Attrition resistance of particle

The attrition resistance was measured according to the procedure described in "Test Method for Synthetic Cracking Catalysts" 6/31-4m-1/57, published by American Cyanamide Co.

$$\text{Attrition loss (\%) } R = B \times 100/(C-A)$$

wherein A represents the weight of particles lost by attrition for a period of time from 0 to 5 hours, g;

B represents the weight of particles lost by attrition for a period of from 5 to 20 hours, g; and C represents the weight of particles used in the test, g.

In this test, C was 50 g. The smaller the attrition loss (%) R, the better the attrition resistance.

EXAMPLE 1

A particulate iron-antimony containing oxide composition [Fe/Sb=1/1.1 (atomic ratio)] was prepared as follows.

1,815 g of nitric acid (65 wt %) was mixed with 1,006 g of pure water, and 218 g of an electrolytic iron powder was added little by little to the mixture. After the iron powder had been completely dissolved, 629 g of a commercially available antimony trioxide was suspended in the solution to prepare a slurry. The content of iron ion in the slurry was 0.9 gram ion per gram atom of antimony, and the content of nitrate ion in the slurry was 3.2 gram ion per gram atom of antimony. This slurry was thoroughly stirred and mixed.

10% aqueous ammonia was sprayed little by little on the slurry to adjust the slurry to pH 1.8 as measured at 40° C. While continuing mixing with satisfactory stirring, the temperature of the slurry was raised from 40° C. to 95° C. over a period of 30 min and then kept at 95° C. for 5 hours. As a result, the color of the slurry changed from reddish brown to brown, and the white antimony trioxide powder disappeared.

This slurry was further homogenized by means of a homogenizer and then spray dried by means of a rotary disk type spray drier at an inlet temperature of 270° C. and an outlet temperature of 170° C. to prepare fine spherical particles which were then heated in an box type oven at 200° C. for 2 hours and then calcined at 400° C. for 2 hours. It was found that ammonium nitrate contained in the spray dried product had been completely decomposed.

A part of the sample was further calcined in nitrogen at 850° C. for 3 hr. After the calcination, the iron-antimony containing oxide composition was observed under a scanning electron microscope and found to be spherical.

EXAMPLES 2 to 4

Particulate iron-antimony containing oxide compositions were produced in the same manner as in Example 1, except that the pH of the aqueous slurry at 40° C. was adjusted to 0.9, 2.3, and 2.6.

Comparative Examples 1 and 2

Particulate iron-antimony containing oxide compositions were produced in the same manner as in Example 1, except that the pH of the aqueous slurry at 40° C. was adjusted to 0.4 or 3.2.

In the case of pH adjustment to 0.4 (Comparative Example 1), the color of the slurry after the heat treatment changed from reddish brown to somewhat bright yellowish brown, and the antimony trioxide disappeared.

In the case of pH adjustment to 3.2 (Comparative Example 2), the color of the slurry after the heat treatment was still considerably deep reddish brown, and a powder considered to be the antimony trioxide powder was present in the slurry, suggesting that the oxidation reaction of antimony trioxide was unsatisfactory.

For the particulate iron-antimony containing oxide compositions of Examples 1 to 4 and Comparative Examples 1 and 2, the compressive strength and the attrition resistance of particles were measured. The results are summarized in Table 1.

TABLE 1

|  | pH value (40° C.) | Product calcined at 400° C. in air | | Product calcined at 850° C. in nitrogen | |
| --- | --- | --- | --- | --- | --- |
|  |  | Compressive strength (gram-weight) | Attrition resistance R (%) | Compressive strength (gram-weight) | Attrition resistance R (%) |
| Example 1 | 1.8 | 30 | 1.7 | 32 | 1.5 |
| Example 2 | 0.9 | 15 | 1.8 | 18 | 1.8 |
| Example 3 | 2.3 | 32 | 1.5 | 28 | 1.0 |
| Example 4 | 2.6 | 21 | 2.0 | 22 | 1.8 |
| Comparative Example 1 | 0.4 | 0.5 | Immeasurable | 1.3 | 3.8 |
| Comparative Example 2 | 3.2 | 1 | 28 | 1.8 | 4.0 |

What is claimed is:

1. A process for producing a particulate iron-antimony containing oxide composition having high compressive strength, which comprises providing an aqueous slurry consisting essentially of water, iron ions, nitrate ions and antimony trioxide; adjusting the slurry to a pH value in the range of 0.5 to 3 as measured at 40° C.; heating the slurry; spray-drying the heated slurry; and calcining the resultant particles.

2. The process according to claim 1, wherein the slurry is adjusted to a pH value in the range of 0.8 to 2.7 as measured at 40° C. and contains ammonium nitrate.

3. The process according to claim 1, wherein the atomic ratio of iron to antimony in the composition is 5 to 23 atoms of antimony to 10 atoms of iron.

4. The process according to claim 1, wherein the calcination is carried out in a nitrogen atmosphere at a temperature of 400 to 950° C.

* * * * *